United States Patent
Srivastava et al.

(10) Patent No.: US 11,036,268 B2
(45) Date of Patent: Jun. 15, 2021

(54) SYSTEM AND METHOD TO RESET DATAPATH LOGIC WITHIN A PERIPHERAL SLAVE DEVICE HAVING MULTIPLE, ASYNCHRONOUS CLOCK DOMAINS

(71) Applicant: Silicon Laboratories Inc., Austin, TX (US)

(72) Inventors: Mudit Srivastava, Singapore (SG); Abreham Delelegn, Oslo (NO)

(73) Assignee: Silicon Laboratories Inc., Austin, TX (US)

( * ) Notice: Subject to any disclaimer, the term of this patent is extended or adjusted under 35 U.S.C. 154(b) by 128 days.

(21) Appl. No.: 16/511,447

(22) Filed: Jul. 15, 2019

(65) Prior Publication Data

US 2021/0018969 A1 Jan. 21, 2021

(51) Int. Cl.
*G06F 1/24* (2006.01)
*G06F 13/42* (2006.01)
*G06F 1/04* (2006.01)

(52) U.S. Cl.
CPC .............. *G06F 1/24* (2013.01); *G06F 1/04* (2013.01); *G06F 13/42* (2013.01)

(58) Field of Classification Search
CPC .............. G06F 1/24; G06F 13/42; G06F 1/04
See application file for complete search history.

(56) References Cited

U.S. PATENT DOCUMENTS

| | | | | | |
|---|---|---|---|---|---|
| 5,826,068 | A | * | 10/1998 | Gates | G06F 13/385 713/600 |
| 6,137,336 | A | * | 10/2000 | Baba | H03L 7/199 327/295 |
| 6,247,082 | B1 | * | 6/2001 | Lo | G06F 13/405 710/105 |
| 6,611,158 | B2 | | 8/2003 | Ehmann | |
| 6,956,414 | B2 | * | 10/2005 | Sweet | H03K 5/04 327/142 |

(Continued)

OTHER PUBLICATIONS

Stein, Paradigm Works, "Crossing the Abyss: Asynchronous Signals in a Synchronous World", EDN, 7 pgs., Jul. 24, 2003.

*Primary Examiner* — Raymond N Phan
(74) *Attorney, Agent, or Firm* — Egan, Enders & Huston LLP.

(57) ABSTRACT

Embodiments of improved systems and methods are provided herein to reset all datapath logic within a peripheral slave device having multiple clock domains. An embodiment of the disclosed method includes receiving a reset request from a host clock device to reset the peripheral slave device, synchronizing the received reset request to each peripheral clock domain included within the peripheral slave device, and using the synchronized reset request generated within each peripheral clock domain to reset datapath logic contained within that peripheral clock domain. As the datapath logic is being reset, the method further includes using the synchronized reset request generated within each peripheral clock domain to generate an acknowledgement for that peripheral clock domain, synchronizing the acknowledgements generated in each peripheral clock domain to a reference clock domain, and combining the synchronized acknowledgements into a single acknowledgement, which is supplied to the host clock device to complete the reset.

24 Claims, 11 Drawing Sheets

(56) References Cited

U.S. PATENT DOCUMENTS

| | | | |
|---|---|---|---|
| 7,409,613 B2* | 8/2008 | Rich | G01R 31/318577 |
| | | | 714/700 |
| 2010/0322365 A1 | 12/2010 | Dobkin | |
| 2011/0163785 A1* | 7/2011 | Chen | G06F 1/04 |
| | | | 327/144 |
| 2018/0129261 A1* | 5/2018 | Garg | G06F 9/4418 |
| 2018/0182440 A1* | 6/2018 | Khare | G11C 7/222 |

* cited by examiner

US 11,036,268 B2

SYSTEM AND METHOD TO RESET DATAPATH LOGIC WITHIN A PERIPHERAL SLAVE DEVICE HAVING MULTIPLE, ASYNCHRONOUS CLOCK DOMAINS

BACKGROUND

1. Field of the Disclosure

This disclosure relates to logic circuitry and, more particularly, to logic circuitry used to reset a peripheral slave device having multiple clock domains.

2. Description of the Relevant Art

The following descriptions and examples are provided as background only and are intended to reveal information that is believed to be of possible relevance to the present invention. No admission is necessarily intended, or should be construed, that any of the following information constitutes prior art impacting the patentable character of the subjected matter claimed herein.

Only the most elemental logic circuits use a single clock. Most data movement applications move data across multiple clock domains. When signals travel from one clock domain to another, the signal appears to be asynchronous in the new clock domain. The circuit that receives the signal in the new clock domain synchronizes the received signal to its own clock to prevent metastability in the first storage element (e.g., a flip-flop) in the new clock domain from propagating through the circuit.

The need to synchronize signals when crossing clock domains is well known in the art and is typically achieved with various types of synchronizers, including but not limited to, level, edge-detecting and pulse synchronizer circuits. As shown in FIG. 1 (PRIOR ART), a level synchronizer circuit can be implemented with two flip-flops (10, 12) that are coupled in series without any combinatorial circuitry between them. This ensures that the first flip-flop (10) will exit its metastable state and its output will stabilize before the second flip-flop (12) samples it. In a level synchronizer, the signal crossing the clock domain stays high and stays low for more than two clock cycles in the new clock domain.

An edge-detecting synchronizer circuit (FIG. 2, PRIOR ART) adds an additional flip-flop (14) to the output of the level synchronizer circuit (10, 12), and thus, includes three flip-flop stages. In some designs, the output of the third flip-flop (14) may be inverted and ANDed with the output of the level synchronizer circuit to detect the rising edge of the input supplied to the edge-detecting synchronizer circuit and generate a clockwide, active high pulse. Alternatively, the output of the level synchronizer may be inverted and ANDed with the output of the third flip-flop to detect the falling edge of the input and generate a clockwide, active low pulse.

A pulse synchronizer circuit (FIG. 3, PRIOR ART) adds a toggle circuit (16) in the originating clock domain to the input of the level synchronizer circuit (10, 12) in the new clock domain, and adds an additional flip-flop (14) and XOR gate to the output of the level synchronizer circuit, for a total of four flip-flop stages. In a pulse synchronizer circuit, a clock pulse in the originating clock domain triggers the toggle circuit so that the output of the toggle circuit switches logic state each time it receives an input pulse. The output of the toggle circuit passes through the level synchronizer circuit (10, 12) to one input of the XOR gate, while a one-cycle-delayed version is supplied to the other input of the XOR gate. Each time the toggle circuit changes state, the output of the pulse synchronizer circuit generates a single clockwide pulse.

Some systems utilize a host-slave architecture, whereby a host device operating at a host clock frequency communicates via one or more buses with a plurality of peripheral slave devices, each operating at their own clock frequencies. In some cases, the host device may use a simple Request/Acknowledgement protocol to synchronously reset the datapaths within the peripheral slave devices. Although such protocol may be used for synchronous reset of peripheral slave devices having only one clock domain, it cannot guarantee that all datapaths within a peripheral slave device will be reset when the peripheral slave device includes multiple clock domains, which are asynchronous to each other and asynchronous to the host clock domain. A need, therefore, remains for an improved datapath reset architecture and method to reset all datapaths within a peripheral slave device having multiple, asynchronous clock domains.

SUMMARY

The present disclosure provides various embodiments of improved systems and related methods to reset all datapath logic within a peripheral slave device having multiple clock domains. The following description of various embodiments of systems and related methods represent example embodiments and is not to be construed in any way as limiting the subject matter of the appended claims.

According to one embodiment, a system provided herein may generally include a host device and at least one peripheral slave device communicatively coupled to the host device. In the present disclosure, the peripheral slave device includes a plurality of peripheral clock domains that are asynchronous to each other and asynchronous to a host clock associated with the host device. In order to reset the datapath logic within each of the asynchronous peripheral clock domains, the peripheral slave device includes datapath reset circuitry and request/acknowledgement handshake circuitry. As described in more detail below, the datapath reset circuitry disclosed herein may generally be coupled to receive a datapath reset request from the host device and may be configured to reset the datapath logic contained within each of the peripheral clock domains. The request/acknowledgement handshake circuitry disclosed herein may generally be coupled to receive the datapath reset request from the host device and may be configured to coordinate a request/acknowledgement handshake between the host device and each of the peripheral clock domains to complete a reset process for the peripheral slave device.

The datapath reset circuitry may generally include a first synchronizer circuit and a first multiplexer for each peripheral clock domain included within the peripheral slave device. The first synchronizer circuit may be coupled to receive the datapath reset request from the host device and may be configured to synchronize the datapath reset request to the peripheral clock domain. The first multiplexer may be coupled to the first synchronizer circuit and may be configured to reset datapath logic contained within the peripheral clock domain upon receiving the synchronized datapath reset request from the synchronizer circuit at a select input of the first multiplexer. Upon receiving the synchronized datapath reset request, the first multiplexer may be configured to supply a reset value to all storage elements included within the peripheral clock domain to reset datapath logic contained within the peripheral clock domain. If the synchronized datapath reset request is not received, the first multiplexer may be configured to supply a signal from the peripheral clock domain to the storage elements included within the peripheral clock domain.

In some embodiments, the datapath reset circuitry may include additional circuit components for resetting datapath logic in a prescaled clock domain included within the at least one peripheral slave device. The additional circuit components may include, for example, a first storage element and a second multiplexer. The first storage element may be coupled to receive the synchronized datapath reset request from the first synchronizer circuit in a first one of the peripheral clock domains and may be configured to output the synchronized datapath reset request on a subsequent clock pulse of a prescaled clock supplied to the prescaled clock domain. The second multiplexer may be coupled to receive the synchronized datapath reset request from the output of the first storage element at a select input of the second multiplexer. Upon receiving the synchronized datapath reset request, the second multiplexer may be configured to supply a reset value to all storage elements included within the prescaled clock domain to reset datapath logic contained within the prescaled clock domain. If the synchronized datapath reset request is not received, the second multiplexer may be configured to supply a signal from the prescaled clock domain to the storage elements included within the prescaled clock domain.

In some embodiments, the datapath reset circuitry may include additional circuit components for resetting a second synchronizer circuit, which is contained within a second one of the peripheral clock domains for synchronizing signals that cross from a first one of the peripheral clock domains to the second one of the peripheral clock domains. The additional circuit components may include, for example, a second multiplexer, an AND gate and a second storage element. The second multiplexer may be coupled to receive the synchronized datapath reset request from the first synchronizer circuit in the first one of the peripheral clock domains at a select input of the second multiplexer, and may be configured to output a reset value if the synchronized datapath reset request is received at the select input of the second multiplexer. If the synchronized datapath reset request is not received, the second multiplexer may be configured to output a signal from the peripheral clock domain.

The AND gate may have a first input coupled to the output of the second multiplexer, a second input coupled to receive an asynchronous system reset, and an output coupled to an inverted clear input of the second storage element. The second storage element may be configured to generate a trigger, which is set by the signal received from the first one of the peripheral clock domains and cleared when the reset value or the asynchronous system reset is supplied to the first or second inputs of the AND gate. When the trigger generated by the second storage element is cleared, the second synchronizer circuit may be reset to a reset state.

The request/acknowledgement handshake circuitry may generally include a first synchronizer circuit and a first storage element for each peripheral clock domain included within the peripheral slave device. The first synchronizer circuit may be coupled to receive the datapath reset request from the host device and may be configured to synchronize the datapath reset request to the peripheral clock domain. The first storage element may be coupled to receive the synchronized datapath reset request from the first synchronizer circuit and may be configured to generate an acknowledgement for the peripheral clock domain.

In the present disclosure, one of the peripheral clock domains is designated as a reference clock domain. For example, the fastest clock frequency of the plurality of peripheral clock domains may be designated as the reference clock domain, in one embodiment. For each peripheral clock domain that is asynchronous to the reference clock domain, the request/acknowledgement handshake circuitry disclosed herein may include a second synchronizer circuit. The second synchronizer circuit included within each peripheral clock domain, which is asynchronous to the reference clock domain, may be coupled to receive the acknowledgement generated by the first storage element in that peripheral clock domain and may be configured to synchronize the acknowledgement to the reference clock domain.

The request/acknowledgement handshake circuitry disclosed herein may further include an AND gate and a second storage element. The AND gate may be coupled to receive the acknowledgment, which is generated by the first storage element in the reference clock domain, and one or more synchronized acknowledgements generated by one or more second synchronizer circuits in one or more asynchronous peripheral clock domains. The AND gate combines the received acknowledgements into a single acknowledgement, which is supplied to the second storage element. The second storage element is clocked by the reference clock domain and coupled to supply the single acknowledgment to the host device to complete the reset process.

In some embodiments, the request/acknowledgement handshake circuitry may include additional circuitry to ensure that acknowledgements are generated in each of the peripheral clock domains and synchronized to the reference clock domain before they are combined into a single acknowledgment. The additional circuit components may include, for example, a counter, a third storage element and a third synchronizer circuit. The counter may be configured to count a number of clock pulses in a slowest clock frequency of the peripheral clock domains and may be configured to overflow when a count value is reached. The third storage element may be configured to generate a timeout value when the counter overflow is supplied to a set input of the third storage element. The third synchronizer circuit may be coupled to receive the timeout value generated by the third storage element and may be configured to synchronize the timeout value to the reference clock domain. In such embodiments, the AND gate may be further coupled to receive the synchronized timeout value from the third synchronizer circuit and may be configured to combine the received acknowledgements and the synchronized timeout value into the single acknowledgement, which is supplied to the second storage element, as discussed above.

In some embodiments, the request/acknowledgement handshake circuitry may include additional circuit components to generate an acknowledgement for a prescaled clock domain included within the peripheral slave device. The additional circuit components may include, for example, a fourth storage element and a fifth storage element. T fourth storage element may be coupled to receive the synchronized datapath reset request from the first synchronizer circuit in the reference clock domain and may be configured to output the synchronized datapath reset request on a subsequent clock pulse of a prescaled clock supplied to the prescaled clock domain. The fifth storage element may be coupled to the output of the fourth storage element and may be configured to generate the acknowledgement for the prescaled clock domain. In such embodiments, the AND gate may be further coupled to receive the acknowledgement generated by the fifth storage element for the prescaled clock domain and may be configured to combine the received acknowledgements and the synchronized timeout value into the single acknowledgement, which is supplied to the second storage element, as discussed above.

In some embodiments, the datapath reset circuitry may include additional circuit components to ensure that the prescaled clock domain receives the correct frequency and prevent setup/hold violations, which may otherwise occur on the datapath of the storage elements included within the prescaled clock domain. The additional circuit components may include, for example, an AND gate and a third multiplexer. The AND gate may be configured to output a logic value upon receiving both the synchronized datapath reset request from the first synchronizer circuit in the reference clock domain and the acknowledgement generated by the fifth storage element in the request/acknowledgement handshake circuitry for the prescaled clock domain. The third multiplexer may be coupled to receive the output of the AND gate at a select input of the third multiplexer, while an output of the third multiplexer is coupled to a prescaler clock generation block, which is included within the at least one peripheral slave device for generating the prescaled clock. If the logic value is received at the select input of the third multiplexer, the third multiplexer may be configured to output a reset value to the prescaler clock generation block. If the logic value is not received at the select input, the third multiplexer may be configured to output a prescaler input to the prescaler clock generation block.

According to another embodiment, a method is provided herein to reset datapath logic within a peripheral slave device including a plurality of peripheral clock domains. In general, the method may include receiving a reset request from a host clock device to reset the peripheral slave device, synchronizing the received reset request to each peripheral clock domain included within the peripheral slave device, and using the synchronized reset request generated within each peripheral clock domain to reset datapath logic contained within that peripheral clock domain.

As the datapath logic is being reset, the method may further include using the synchronized reset request generated within each peripheral clock domain to generate an acknowledgement for that peripheral clock domain, synchronizing the acknowledgements generated in each peripheral clock domain to a reference clock domain, and combining the synchronized acknowledgements into a single acknowledgement, which is supplied to the host clock device to complete the reset.

In some embodiments, the method may further include generating a timeout value based on a count value and a slowest clock frequency of the peripheral clock domains, synchronizing the timeout value to the reference clock domain, and combining the synchronized timeout value and the synchronized acknowledgements into a single acknowledgement, which is supplied to the host clock device to complete the reset. In some embodiments, the count value may be substantially equal to a number of flip-flop stages included a synchronizer circuit plus one clock cycle. The synchronizer circuit may generally be one, which is used to synchronize an acknowledgement generated in one of the peripheral clock domains.

BRIEF DESCRIPTION OF THE DRAWINGS

Other objects and advantages of the invention will become apparent upon reading the following detailed description and upon reference to the accompanying drawings.

Figure 1:
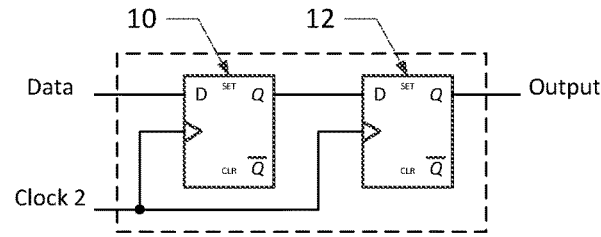
FIG. 1 (PRIOR ART) is a block diagram of a level synchronizer circuit.
Figure 2:
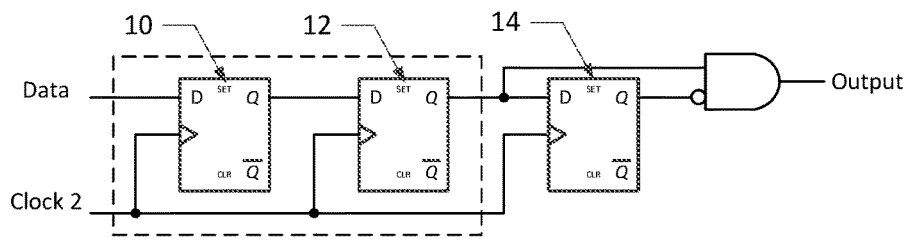
FIG. 2 (PRIOR ART) is a block diagram of an edge-detecting synchronizer circuit.
Figure 3:
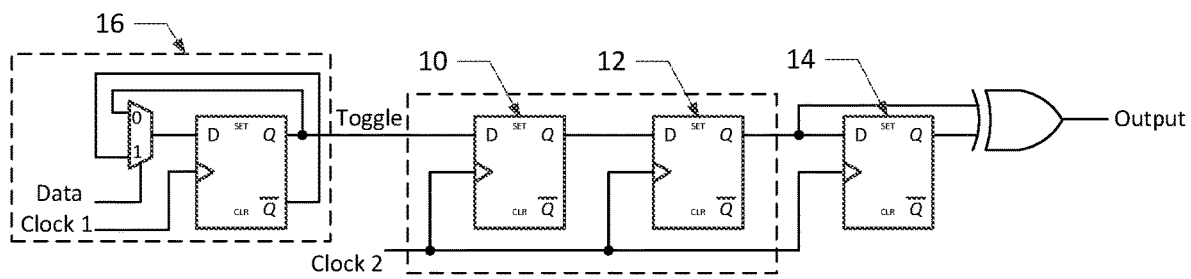
FIG. 3 (PRIOR ART) is a block diagram of a pulse synchronizer circuit.

While the present disclosure is susceptible to various modifications and alternative forms, specific embodiments thereof are shown by way of example in the drawings and will herein be described in detail. It should be understood, however, that the drawings and detailed description thereto are not intended to limit the present disclosure to the particular form disclosed, but on the contrary, the intention is to cover all modifications, equivalents and alternatives falling within the spirit and scope of the present disclosure as defined by the appended claims.

DETAILED DESCRIPTION OF THE PREFERRED EMBODIMENTS

Generally speaking, the present disclosure provides various embodiments of improved systems, circuitry and related methods to reset all datapath logic within a peripheral slave device having multiple clock domains. Embodiments of the disclosed system utilize a host-slave architecture, whereby a host device communicatively coupled to a plurality of peripheral slave devices generates a datapath reset request in a host clock domain, which is sent asynchronously to at least one of the plurality of peripheral slave devices. Unlike conventional reset solutions, the improved systems, circuitry and methods disclosed herein guarantee a clean reset of all datapath logic included within a peripheral slave device having multiple clock domains, which are asynchronous to each other and asynchronous to the host clock domain supplying the datapath reset request. In addition to providing a clean reset of all datapath logic, the embodiments disclosed herein are scalable to substantially any number of peripheral clock domains, and are not tied to any particular type of peripheral slave device.

Figure 4:
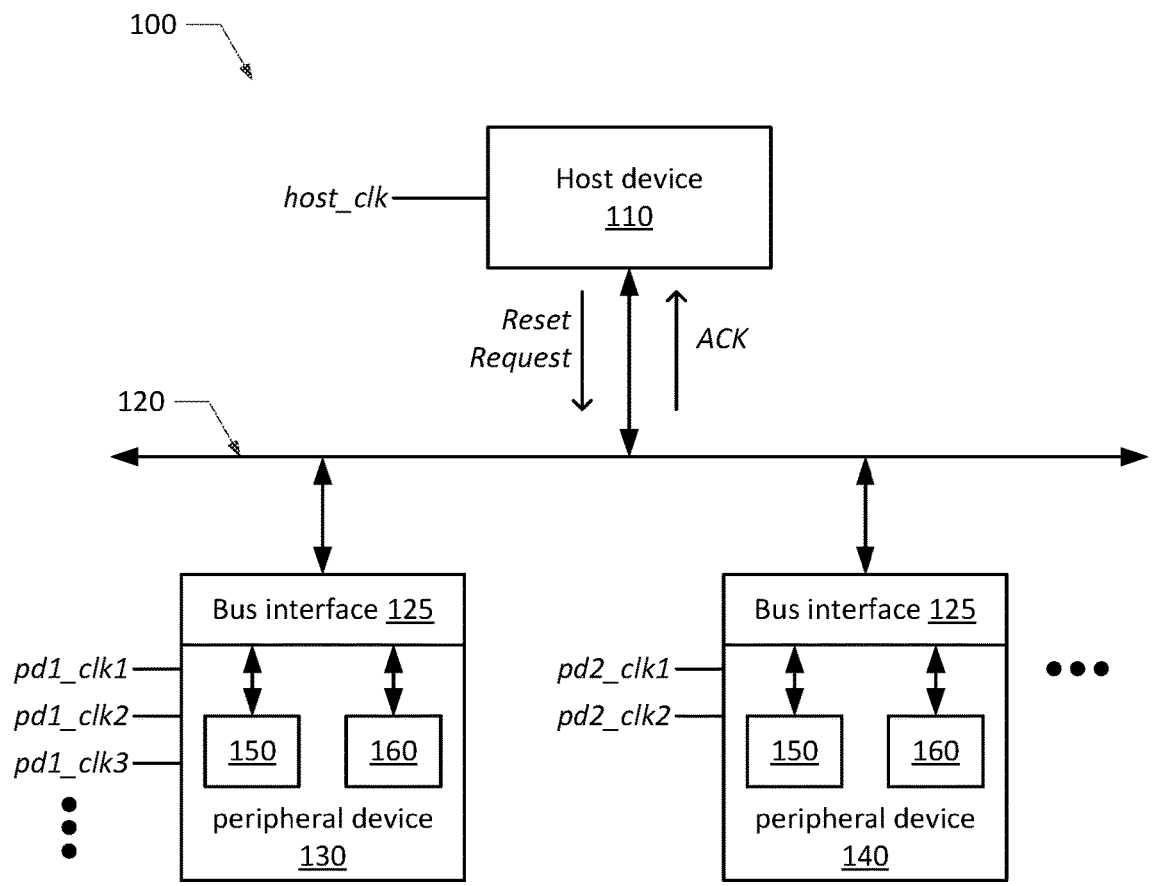
FIG. 4 is a block diagram illustrating one embodiment of a system comprising a host device communicatively coupled to a plurality of peripheral slave devices, each containing multiple clock domains, datapath reset circuitry and request/acknowledgement handshake circuitry.

FIG. 4 illustrates one embodiment of an improved system 100 in accordance with the present disclosure. As shown in FIG. 4, system 100 may generally include a host device (110) that is communicatively coupled via one or more buses (120) to a plurality of peripheral slave devices (e.g., 130, 140 . . . ). Host device 110 may generally include hardware, firmware and/or software components. In one embodiment, host device 110 may be a processing device (e.g., a central processing unit, CPU), which is configured to execute firmware and/or software components (e.g., computer program instructions) for the system. It should be understood, however, that host device 110 is not strictly limited to a CPU, and may include other types of processing devices, controllers, or microprocessors within a System on Chip (SoC) that function to control, communicate with and/or configure a plurality of peripheral slave devices. As described in more detail below, host device 110 may be generally configured to execute program instructions and communicate with the peripheral slave devices in accordance with a host clock (host_clk).

Host device 110 and peripheral slave devices 130, 140 may each include one or more communication bus interfaces (115, 125) for communicating data and signals there between in accordance with one or more communication protocols. Examples of communication bus interfaces (115, 125) that may be included within the host and peripheral slave devices include, but are not limited to, a Peripheral Component Interconnect (PCI) interface, a PCI-Express (PCIe) interface, a Serial Peripheral Interface (SPI), an Enhanced SPI (eSPI), a Direct Media Interface (DMI), a Serial AT Attachment (SATA) interface, a Low Pin Count (LPC) interface, a Small Computer Serial Interface (SCSI), an Industry Standard Architecture (ISA) interface, an Inter-Integrated Circuit (I²C) interface, a Universal Serial Bus (USB) interface, a Thunderbolt™ interface, and an Advanced Microcontroller Bus Architecture (AMBA) with Advanced High-Performance Bus (AHB) and Advanced Peripheral Bus (APB) system.

Examples of peripheral slave devices (130, 140 . . . ) that may be included within system 100 include, but are not limited to, a digital-to-analog-converter (DAC), an analog-to-digital-converter (ADC), a Universal Asynchronous Receiver/Transmitter (UART), various mixed signal or pure digital modules in a micro-controller unit (MCU), a Liquid Crystal Display (LCD) controller, a sensor controller, comparators, timers, and information capture agents. It is noted that, although two peripheral slave devices (130, 140) are shown in FIG. 4, system 100 may include substantially any number and/or type of peripheral slave devices.

In some embodiments, each peripheral slave device (130, 140 . . . ) may include multiple clock domains, which are asynchronous to each other and asynchronous to the host clock (host_clk). In the embodiment shown in FIG. 4, for example, peripheral slave device 130 is depicted as including at least three asynchronous clock domains (e.g., pd1_clk1, pd1_clk2, pd1_clk3), while peripheral slave device 140 includes only two asynchronous clock domains (e.g., pd2_clk1, pd2_clk2). It is noted that peripheral slave devices in accordance with the present disclosure are not strictly limited to the number of peripheral clock domains expressly shown in FIG. 4, and that the concepts described herein may be generally applied to peripheral slave devices having two or more asynchronous clock domains.

Figure 7:
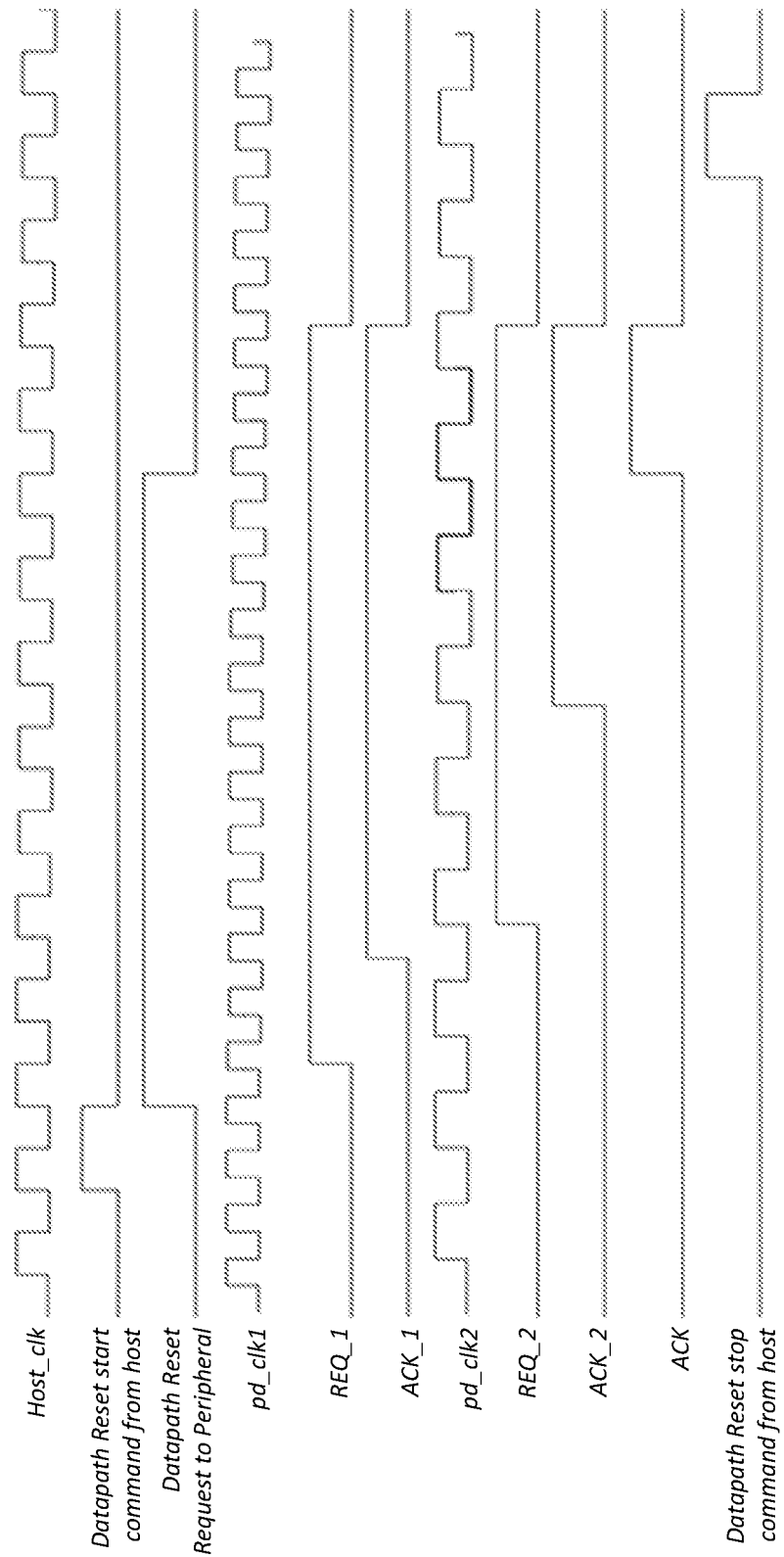
FIG. 7 is a timing diagram for signals involved in resetting the datapath logic in two peripheral clock domains and generating an acknowledgement to be supplied to the host device.

In the present disclosure, a request/acknowledgement protocol is used to reset the datapath logic included within each clock domain of a peripheral slave device having multiple clock domains. As shown in FIGS. 4 and 7, for example, host device 110 may execute a datapath reset start command and generate a datapath reset request (Reset Request) in synchronization with the host clock (host_clk) to begin a datapath reset process for one or more peripheral slave devices communicatively coupled to the host device. Since the peripheral slave device(s) include multiple clock domains (e.g., pd_clk1, pd_clk2), which are asynchronous to the host clock (host_clk), the datapath reset request (Reset Request) generated by host device 110 may be supplied as an asynchronous reset request to the peripheral slave device(s).

As shown in FIG. 4, each peripheral slave device containing multiple clock domains includes datapath reset circuitry 150 to reset the datapath logic contained within each peripheral clock domain, and request/acknowledgement handshake circuitry 160 to ensure that all datapath logic is reset before an acknowledgement is sent to host device 110 to complete the reset process.

Upon receiving a datapath reset request (Reset Request) from host device 110, datapath reset circuitry 150 synchronizes the datapath reset request to each of the peripheral clock domains included within the peripheral slave device and uses each synchronized reset request to reset the datapath logic contained within a respective peripheral clock domain. Request/acknowledgement handshake circuitry 160 uses the synchronized reset requests in each peripheral clock domain to generate acknowledgements that are synchronized and combined into a single acknowledgement, which is provided to host device 110 to complete the reset process. In some embodiments, request/acknowledgement handshake circuitry 160 may include additional circuitry (or alternatively, a state machine) to ensure that all datapath logic is reset before the combined acknowledgement is sent to host device 110.

Figure 5:
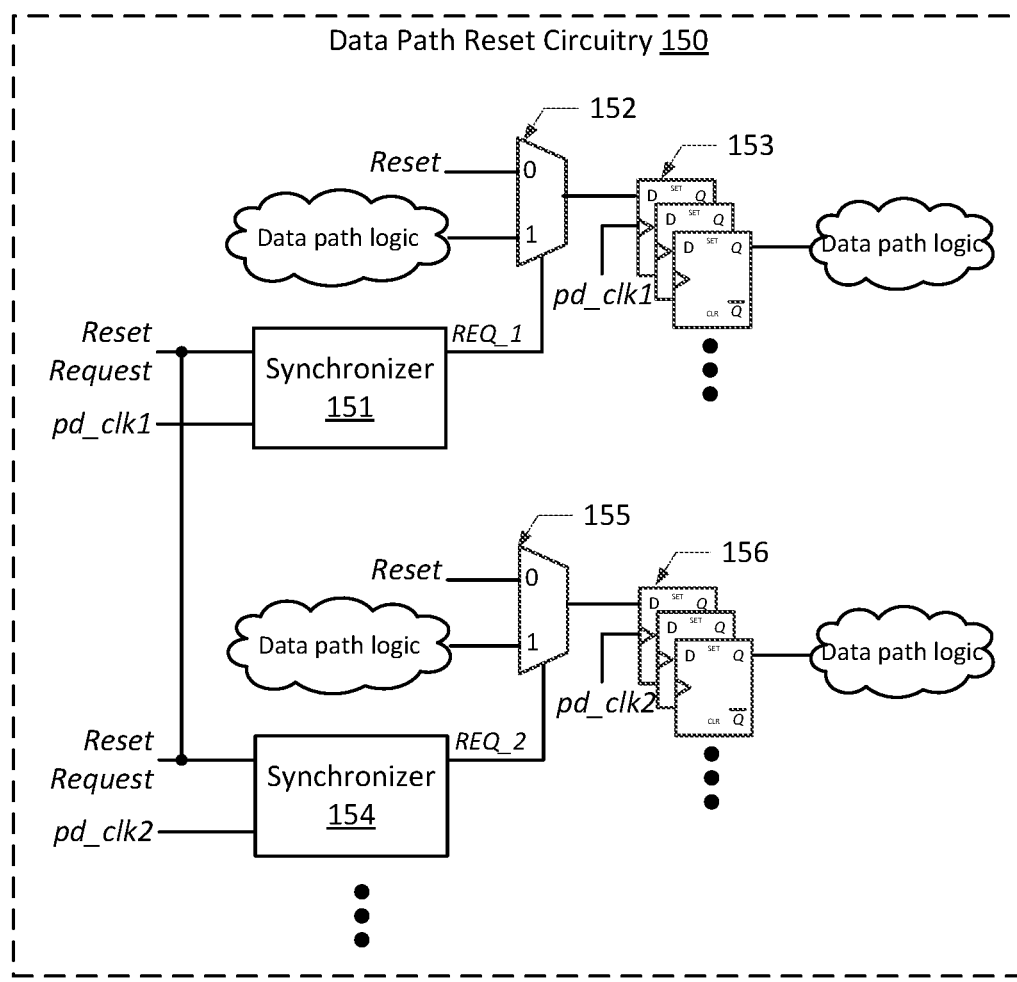
FIG. 5 is a block diagram illustrating one embodiment of the datapath reset circuitry shown in FIG. 4.
Figure 6:
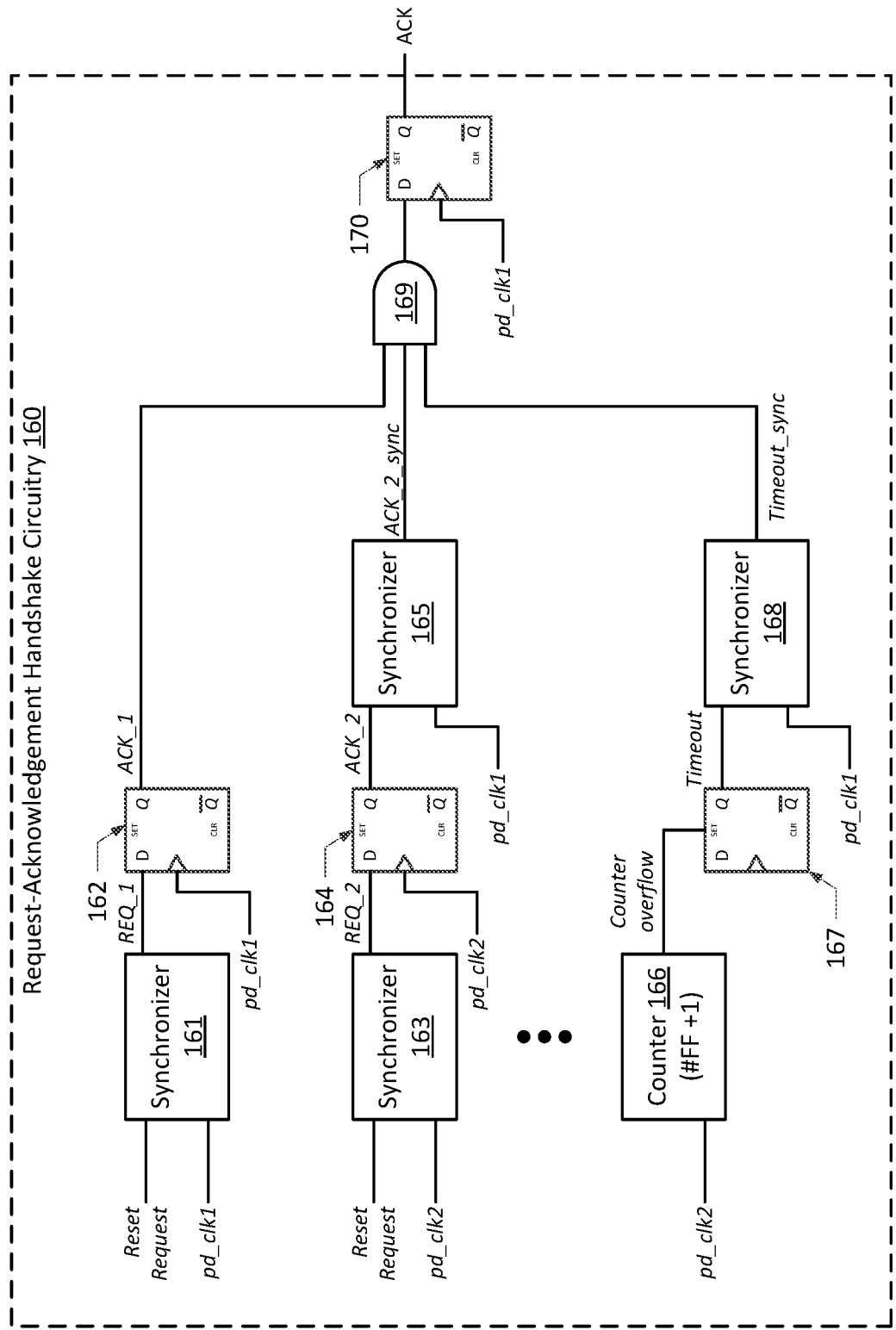
FIG. 6 is a block diagram illustrating one embodiment of the request/acknowledgement handshake circuitry shown in FIG. 4.

FIGS. 5 and 6 respectively illustrate embodiments of the datapath reset circuitry 150 and the request/acknowledgement handshake circuitry 160 shown in block diagram form in FIG. 4. FIG. 7 provides a timing diagram for signals involved in resetting the datapath logic in a peripheral slave device (e.g., peripheral slave device 140) including two peripheral clock domains (pd_clk1, pd_clk2), and generating an acknowledgement supplied to host device 110.

FIG. 5 illustrates one embodiment of datapath reset circuitry 150 that may be included within a peripheral slave device (130, 140 . . . ) containing at least two peripheral clock domains (pd_clk1, pd_clk2). As shown in FIGS. 5 and 7, datapath reset circuitry 150 is coupled to receive the datapath reset request (Reset Request), which is generated by host device 110 and supplied asynchronously to the peripheral slave device. Upon receiving the datapath reset request (Reset Request), datapath reset circuitry 150 synchronizes the datapath reset request to each peripheral clock domain (pd_clk1, pd_clk2) included within the peripheral slave device and uses each synchronized reset request to reset the datapath logic contained within a respective peripheral clock domain.

To perform such function, datapath reset circuitry 150 may generally include a first synchronizer circuit and a first multiplexer for each peripheral clock domain included within the peripheral slave device. In the example embodiment shown in FIG. 5, datapath reset circuitry 150 includes a first synchronizer circuit (151, 154) and a first multiplexer (152, 155) for two clock domains (pd_clk1, pd_clk2), which are asynchronous to each other and asynchronous to the host clock (host_clk). It is understood, however, that datapath reset circuitry 150 could easily be scaled to include additional synchronizers and multiplexers for one or more additional peripheral clock domains.

The first synchronizer circuits (151, 154) included within datapath reset circuitry 150 receive the datapath reset request (Reset Request) sent from the host clock domain (host_clk) and synchronize the datapath reset request to each respective peripheral clock domain (pd_clk1, pd_clk2). The first synchronizer circuits (151, 154) may be implemented using substantially any type of synchronizer circuit having substantially any number of flip-flop stages. In one embodiment, level synchronizer circuits containing two flip-flop stages (see, e.g., FIG. 1) may be used to implement the first synchronizer circuits (151, 154) shown in FIG. 5. It is understood, however, that other types of synchronizer circuits (e.g., edge-detecting or pulse synchronizer circuits) and/or another number of flip-flop stages could alternatively be used to implement the first synchronizer circuits (151, 154) shown in FIG. 5. For example, a pulse synchronizer circuit having three flip-flop stages may be used in peripheral clock domains having relatively fast clock frequencies (e.g., between about 1 MHz and about 100 MHz).

The first multiplexers (152, 155) included within datapath reset circuitry 150 use the synchronized reset requests (REQ_1, REQ_2) in each respective peripheral clock domain to reset the datapath logic contained within that clock domain. Upon receiving a synchronized reset request (REQ_1, REQ_2) at its select input, the first multiplexers (152, 155) supply a reset value (Reset) to all storage elements (e.g., flip-flops) (153, 156) included within their respective peripheral clock domain to reset the datapath logic contained therein. If a synchronized reset request (REQ_1, REQ_2) is not received, the first multiplexers (152, 155) forward a signal (or data) from the peripheral clock domain to the storage elements (153, 156) instead of the reset value. As the datapath logic is being reset, request/acknowledgement handshake circuitry 160 coordinates the request/acknowledgement handshake between host device 110 and each of the peripheral clock domains to complete the reset process.

FIG. 6 illustrates one embodiment of request/acknowledgement handshake circuitry 160 that may be included within a peripheral slave device (130, 140 . . . ) containing at least two peripheral clock domains (pd_clk1, pd_clk2). As shown in FIG. 6, request/acknowledgement handshake circuitry 160 is coupled to receive the reset request (Reset Request), which is generated by host device 110 and supplied asynchronously to the peripheral slave device. Upon receiving the datapath reset request (Reset Request), request/acknowledgement handshake circuitry 160 synchronizes the datapath reset request to each peripheral clock domain (pd_clk1, pd_clk2) included within the peripheral slave device, uses the synchronized reset requests (REQ_1, REQ_2) to generate an acknowledgement (ACK_1, ACK_2) for each peripheral clock domain, synchronizes the ACKs generated in each peripheral clock domain to a reference clock domain (e.g., a fastest one of the peripheral clock domains), and provides a combined acknowledgement (ACK) to host device 110 once all ACKs are generated in each peripheral clock domain and synchronized to the reference clock domain.

To perform such function, request/acknowledgement handshake circuitry 160 may generally include a first synchronizer circuit and a first storage element (e.g., a flip-flop) for each peripheral clock domain included within a peripheral slave device to generate an acknowledgement (ACK_1, ACK_2) for each peripheral clock domain. For each peripheral clock domain that is asynchronous to the reference clock domain (i.e., differs in frequency and/or phase from the reference clock domain), a second synchronizer circuit may be included within request/acknowledgement handshake circuitry 160 to synchronize the ACKs generated in each peripheral clock domain to the reference clock domain. In some embodiments, request/acknowledgement handshake circuitry 160 may include an AND gate and a second storage element to combine the synchronized ACKs into a single ACK, which is provided to host device 110 to complete the reset process. In addition, request/acknowledgement handshake circuitry 160 may include a counter, a third storage element and a third synchronizer circuit to ensure that ACKs are generated in each of the peripheral clock domains and synchronized to the reference clock domain before they are combined into a single ACK. In other embodiments, a state machine may be used, in lieu of the AND gate, second storage element, counter, third storage element and third synchronizer circuit, to wait for ACKs to be generated in each of the peripheral clock domains, to combine the ACKs into a single ACK, and to supply the combined ACK to the host device to complete the reset process. Since the combined ACK is generated in the reference clock domain, which is asynchronous to the host clock domain, the host device may include synchronization circuitry, in one embodiment, to receive the combined ACK supplied from the reference clock domain to host clock domain and to issue a datapath reset stop command to complete the reset process.

In the example embodiment shown in FIG. 6, request/acknowledgement handshake circuitry 160 includes a first synchronizer circuit (161, 163) and a first storage element (162, 164) for two peripheral clock domains (pd_clk1, pd_clk2), which are asynchronous to each other and asynchronous to the host clock domain (host_clk). Although circuitry is provided for only two peripheral clock domains (pd_clk1, pd_clk2) in FIG. 6, request/acknowledgement handshake circuitry 160 could easily be scaled to include additional first synchronizer circuit(s) and additional first storage element(s) for one or more additional peripheral clock domains.

The first synchronizer circuits (161, 163) included within request/acknowledgement handshake circuitry 160 receive the datapath reset request (Reset Request) sent from the host clock domain (host_clk) and synchronize the datapath reset request to each respective peripheral clock domain (pd_clk1, pd_clk2). The first storage elements (162, 164) receive the synchronized reset requests (REQ_1, REQ_2) generated by the first synchronizer circuits (161, 163), register the synchronized reset requests, and output acknowledgements (ACK_1, ACK_2) for each respective peripheral clock domain (pd_clk1, pd_clk2). For each peripheral clock domain that differs in frequency and/or phase from the reference clock domain, a second synchronizer circuit (165) is included to synchronize the acknowledgement generated in those peripheral clock domain(s) to the reference clock domain.

In the embodiment shown in FIG. 6, the first peripheral clock domain (pd_clk1) is the fastest clock domain of the peripheral clock domains, and thus, is chosen as the reference clock domain. While any peripheral clock can be chosen as a reference clock, choosing the fastest clock domain as the reference clock domain helps to quickly synchronize all of the acknowledgements generated in the asynchronous peripheral clock domains to the reference clock domain, thereby providing the most time efficient datapath reset methodology. Because the second peripheral clock domain (pd_clk2) is asynchronous to the first peripheral clock domain (pd_clk1), a second synchronizer circuit (165) is coupled to the output of first storage element 164 to synchronize the acknowledgement (ACK_2) generated in the second peripheral clock domain (pd_clk2) to the reference clock domain (pd_clk1). In the embodiment shown in FIG. 6, the synchronized acknowledgements (ACK_1, ACK_2 sync) are supplied to inputs of AND gate (169). Once synchronized acknowledgments from all peripheral clock domains are received, AND gate 169 outputs a logic value to a second storage element (170), which is clocked by the reference clock domain (pd_clk1), to combine the synchronized acknowledgements (ACK_1, ACK_2 sync) into a single acknowledgement (ACK) that is provided to host device 110 to complete the reset process.

In some embodiments, request/acknowledgement handshake circuitry 160 may include additional circuitry to ensure that ACKs are generated in each of the peripheral clock domains (pd_clk1, pd_clk2) and synchronized to the reference clock domain (pd_clk1) before they are combined into a single ACK. In the embodiment shown in FIG. 6, for example, request/acknowledgement handshake circuitry 160 includes a counter (166), a third storage element (167) and a third synchronizer circuit (168). Counter (166) counts the number of clock pulses in the slowest clock frequency (e.g., pd_clk2) of the peripheral clock domains until a count value is reached. In some embodiments, the count value may be substantially equal to the number of flip-flop stages included within the synchronizer circuits (161, 163, 165) plus one clock cycle to ensure that MTBF (Mean Time Between Failures) is met or exceeded for the synchronizer circuits. For example, if two flip-flop stages are included within the synchronizer circuits (161, 163, 165), counter 166 counts clock pulses of the slowest clock frequency (e.g., pd_clk2) until the count value reaches (2+1=) 3. When the counter (166) overflows, the overflow is supplied to the SET input of the third storage element (167) to generate a timeout value (Timeout), which is supplied to the third synchronizer circuit (168). The third synchronizer circuit (168) synchronizes the timeout value to the reference clock domain (pd_clk1) and supplies the synchronized timeout value (Timeout_sync) to AND gate 169 and second storage element 170, where it is combined with the synchronized ACKs into a single ACK. This guarantees that ACKs are generated in each of the peripheral clock domains and synchronized to the reference clock domain before they are combined into a single ACK, and ensures that all synchronizers configured to handle the datapath crossing from one clock domain to another are also reset to a reset state after the datapath reset request is issued from the host device 110.

Like the synchronizer circuits (151, 154) shown in FIG. 5, the synchronizer circuits (161, 163, 165, 168) shown in FIG. 6 may be implemented using substantially any type of synchronizer circuit having substantially any number of flip-flop stages. In one embodiment, level synchronizer circuits containing two flip-flop stages (see, e.g., FIG. 1) may be used to implement the synchronizer circuits (161, 163, 165, 168) shown in FIG. 6. It is understood, however, that other types of synchronizer circuits (e.g., edge-detecting or pulse synchronizer circuits) and/or another number of flip-flop stages could also be used to implement one or more of the synchronizer circuits (161, 163, 165, 168) shown in FIG. 6. For example, a pulse synchronizer circuit having three flip-flop stages may be used in the reference clock domain (pd_clk1) to accommodate the faster clock frequency (e.g., a few hundred MHz) used in that domain.

FIGS. 5 and 6 illustrate one embodiment of the datapath reset circuitry 150 and the request/acknowledgement handshake circuitry 160 that may be included within a peripheral slave device (130, 140 . . . ) containing multiple clock domains to guarantee a clean reset of all datapath logic contained within the multiple clock domains. The datapath reset circuitry 150 and request/acknowledgement handshake circuitry 160 shown in FIGS. 5 and 6 guarantee a clean reset of the datapath logic contained within each peripheral clock domain by providing a request/acknowledgement handshake that delays sending an acknowledgement (ACK) to host device 110 until acknowledgements are generated in each peripheral clock domain and synchronized to the reference clock domain. In addition to providing a clean reset of all datapath logic, the datapath reset circuitry 150 and the request/acknowledgement handshake circuitry 160 shown in FIGS. 5 and 6 are not tied to any particular peripheral slave device and are scalable to any number of peripheral clock domains.

FIG. 7 provides a timing diagram for signals involved in resetting the datapath logic in a peripheral slave device (e.g., peripheral slave device 140) including two peripheral clock domains (pd_clk1, pd_clk2), and generating an acknowledgement supplied to host device 110. The timing diagram shown in FIG. 7 shows the peripheral clock domains (pd_clk1, pd_clk2) are asynchronous to each other and are asynchronous to the host clock (Host_clk). As shown in FIG. 7, host device 110 may begin a datapath reset process for a peripheral slave device by executing a datapath reset start command and generating a datapath reset request (Reset Request) in synchronization with the host clock (host_clk). Upon receiving the datapath reset request (Reset Request), the datapath reset circuitry 150 within the peripheral slave device synchronizes the datapath reset request to each peripheral clock domain (pd_clk1, pd_clk2) included within the peripheral slave device and uses each synchronized reset request (REQ_1, REQ_2) to reset the datapath logic contained within a respective peripheral clock domain. As the datapath logic is being reset, request/acknowledgement handshake circuitry 160 uses the synchronized reset requests (REQ_1, REQ_2) to generate an acknowledgement (ACK_1, ACK_2) for each peripheral clock domain, synchronizes the ACKs generated in each peripheral clock domain to a reference clock domain (pd_clk1), and provides a combined acknowledgement (ACK) to host device 110 once all ACKs are generated in each peripheral clock domain and synchronized to the reference clock domain. Once the combined acknowledgement (ACK) is received, host device 110 executes a datapath reset stop command to complete the reset process.

Figure 8:
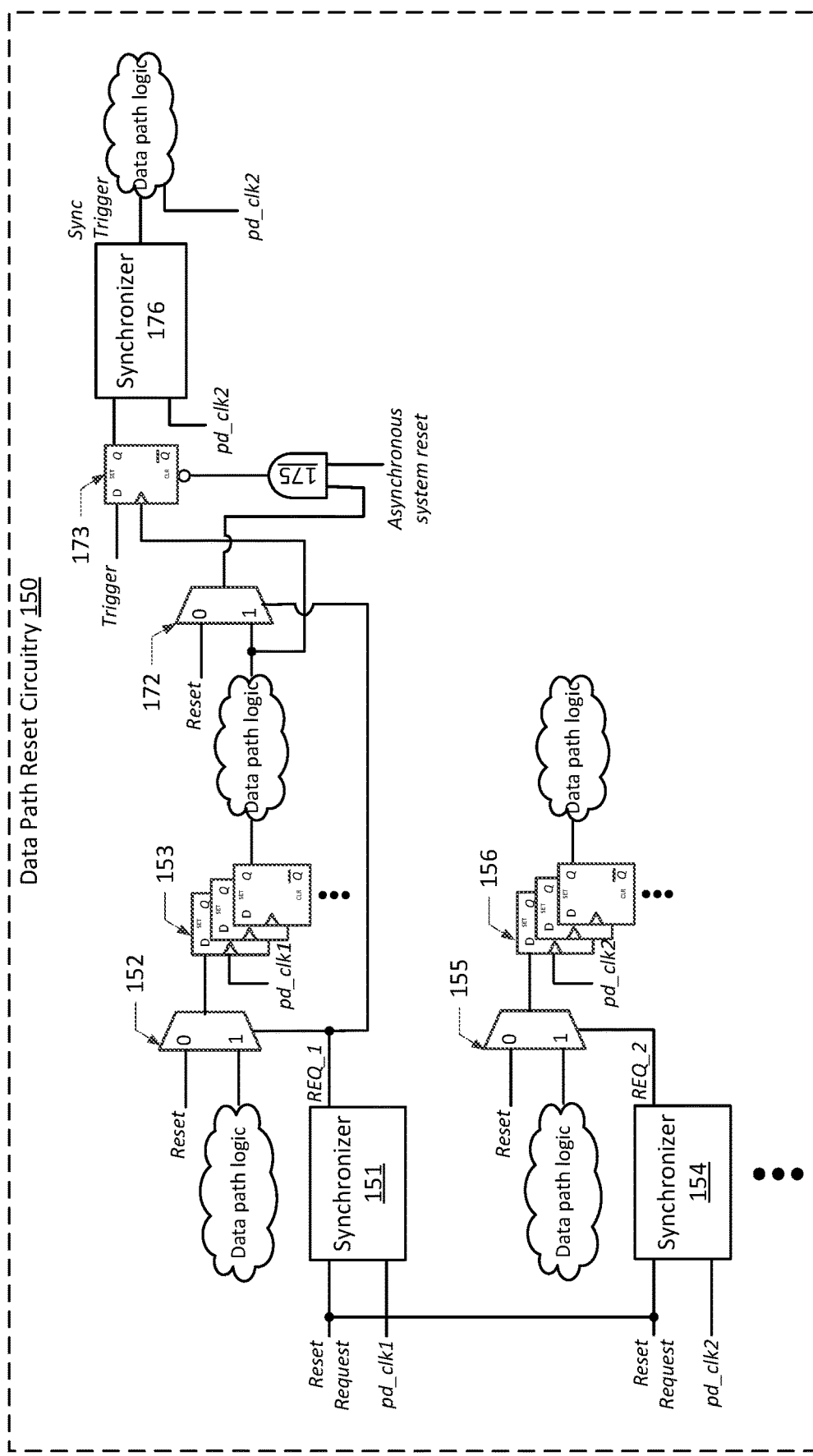
FIG. 8 is a block diagram illustrating another embodiment of the datapath reset circuitry shown in FIG. 4.

FIG. 8 illustrates an alternative embodiment of the datapath reset circuitry 150 shown in FIG. 5. In addition to the logic components shown in FIG. 5, the datapath reset circuitry 150 shown in FIG. 8 includes additional circuit components for resetting synchronizer circuits (176) included within a second peripheral clock domain (pd_clk2) for synchronizing signals that cross from a first peripheral clock domain (pd_clk1) to the second peripheral clock domain (pd_clk2). More specifically, the datapath reset circuitry 150 shown in FIG. 8 includes a second multiplexer (172), a second storage element (173), and an AND gate (175) for resetting a synchronizer circuit (176), which is included within a second peripheral clock domain (pd_clk2)

for synchronizing signals that cross from a first peripheral clock domain (pd_clk1) to the second peripheral clock domain (pd_clk2).

As shown in FIG. 8, the second multiplexer (172) is coupled to supply a signal from the first peripheral clock domain (pd_clk1) or a reset value (Reset) to a first input of AND gate 175, depending on whether a synchronized reset request (REQ_1) is received from synchronizer circuit 151 at the select input of the second multiplexer. When a synchronized reset request (REQ_1) is received at its select input, the second multiplexer (172) supplies the reset value (Reset) to the first input of AND gate 175. The second input of AND gate 175 is coupled to receive an asynchronous system reset. In some embodiments, the asynchronous system reset may be a Power on Reset (POR) or a pin reset (depending on the particular peripheral slave device), which may be asserted by a reset control unit triggered by a number of different factors (e.g., a reset condition generated by a system failure or to bring the system back to an initial condition, a dip in the power supply beyond it's threshold minimum, a drop in bias voltage beyond a limit, etc.).

In one embodiment, the output of AND gate 175 is supplied to an inverted clear (CLR) input of second storage element 173, which is clocked by datapath logic in the first peripheral clock domain (pd_clk1). As described in more detail below, the second storage element 173 generates a trigger (Trigger), which is set by the datapath logic in the first peripheral clock domain (pd_clk1) and cleared when the reset value (Reset) or the asynchronous system reset are supplied to the first and second inputs of AND gate 175. Clearing the trigger (Trigger) resets the second synchronizer circuit (176) by resetting the flip-flops contained therein. In another embodiment, the second storage element 173 may have an active high clear (CLR) input. In such an embodiment, AND gate 175 may be replaced with a NAND gate or any other logic gate to ensure asynchronous clear of the second storage element 173.

When a datapath reset request (Reset Request) is received from host device 110, synchronizer circuit 151 supplies an active HIGH synchronized reset request (REQ_1) to the select input of the second multiplexer (172), which in turn supplies an active LOW reset value (Reset) to the first input of AND gate 175. Upon receiving the active LOW reset value (Reset), AND gate 175 supplies an active LOW value to the inverted clear (CLR) input of the second storage element (173), which clears the trigger (Trigger) generated by the second storage element and resets the flip-flops within the second synchronizer circuit (176). The second synchronizer circuit (176) synchronizes the trigger to the second peripheral clock domain (pd_clk2) before supplying the synchronized trigger (Synchronized Trigger) to the datapath logic in the second clock domain (pd_clk2).

The additional circuit components (i.e., second multiplexer 172, second storage element 173 and an AND gate 175) shown in FIG. 8 ensure that the synchronizer circuit (176), which is included within the peripheral slave device to handle datapath crossings from the first peripheral clock domain (pd_clk1) to the second peripheral clock domain (pd_clk2), is reset when a datapath reset request (Reset Request) is received from host device 110. It is understood, however, that the additional circuit components (172, 173, 175) shown in FIG. 8 may also be used to reset other synchronizer circuits, which are included within the peripheral slave device to handle datapath crossings from one peripheral clock domain to another.

Figure 9:
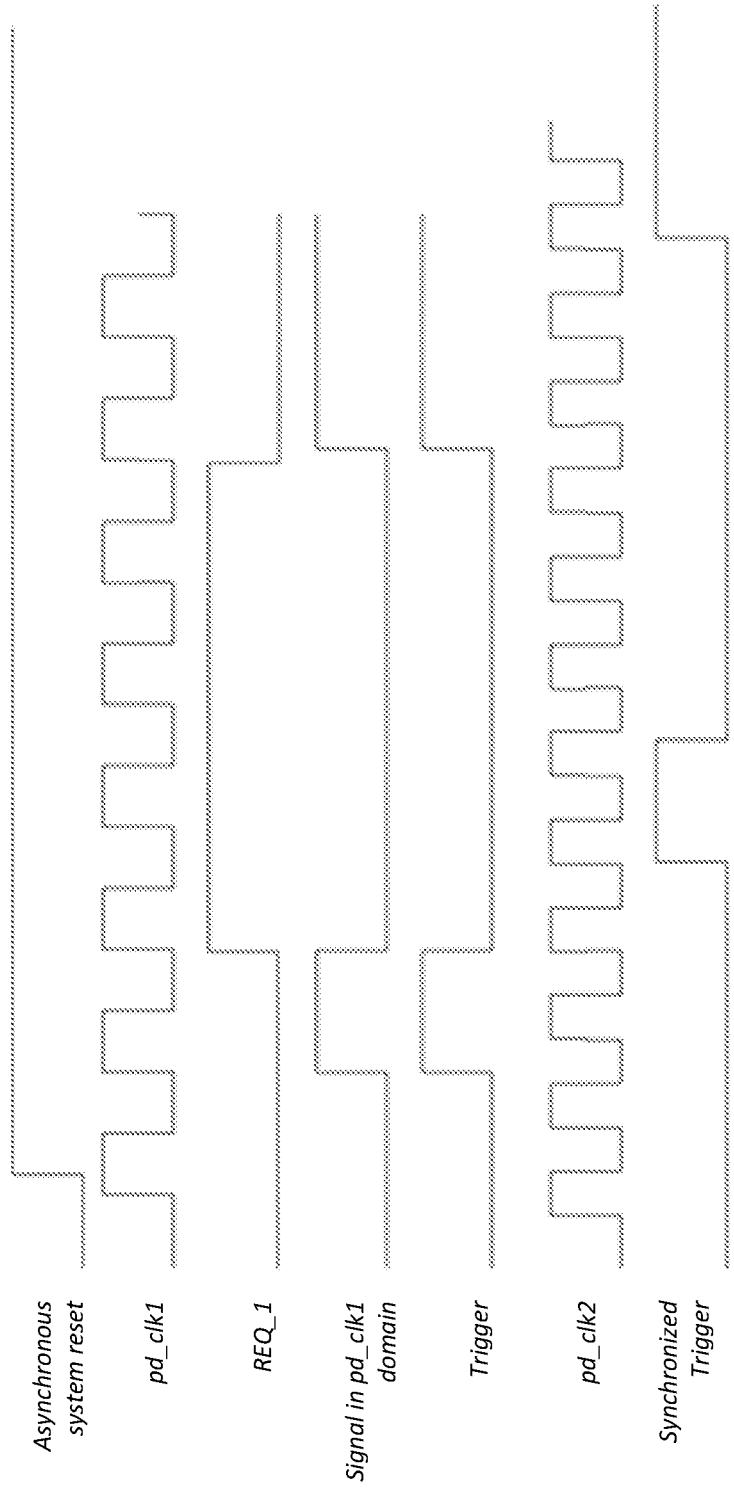
FIG. 9 is a timing diagram for signals involved in resetting a synchronizer circuit included within a second peripheral clock domain when a signal from a first peripheral clock domain crosses into the second peripheral clock domains.

FIG. 9 provides a timing diagram for signals involved in resetting a synchronizer circuit (176) included within the second peripheral clock domain (pd_clk2) when a signal from the first peripheral clock domain (pd_clk1) crosses into the second peripheral clock domain. FIG. 9 shows that when either the asynchronous system reset or the synchronized reset request (REQ_1) from synchronizer 151 is asserted, the trigger (Trigger) generated by the second storage element (173) is cleared and synchronized by synchronizer circuit 176 to the second peripheral clock domain (pd_clk2). This ensures that the flip-flops within synchronizer circuit 176 are reset by the datapath reset request. The synchronized trigger (Synchronized Trigger) generated by synchronizer circuit 176 is supplied to the datapath logic in the second clock domain (pd_clk2). This synchronized trigger supplies the reset value to the datapath logic in the second clock domain, when the datapath reset request is issued by the host.

Figure 10:
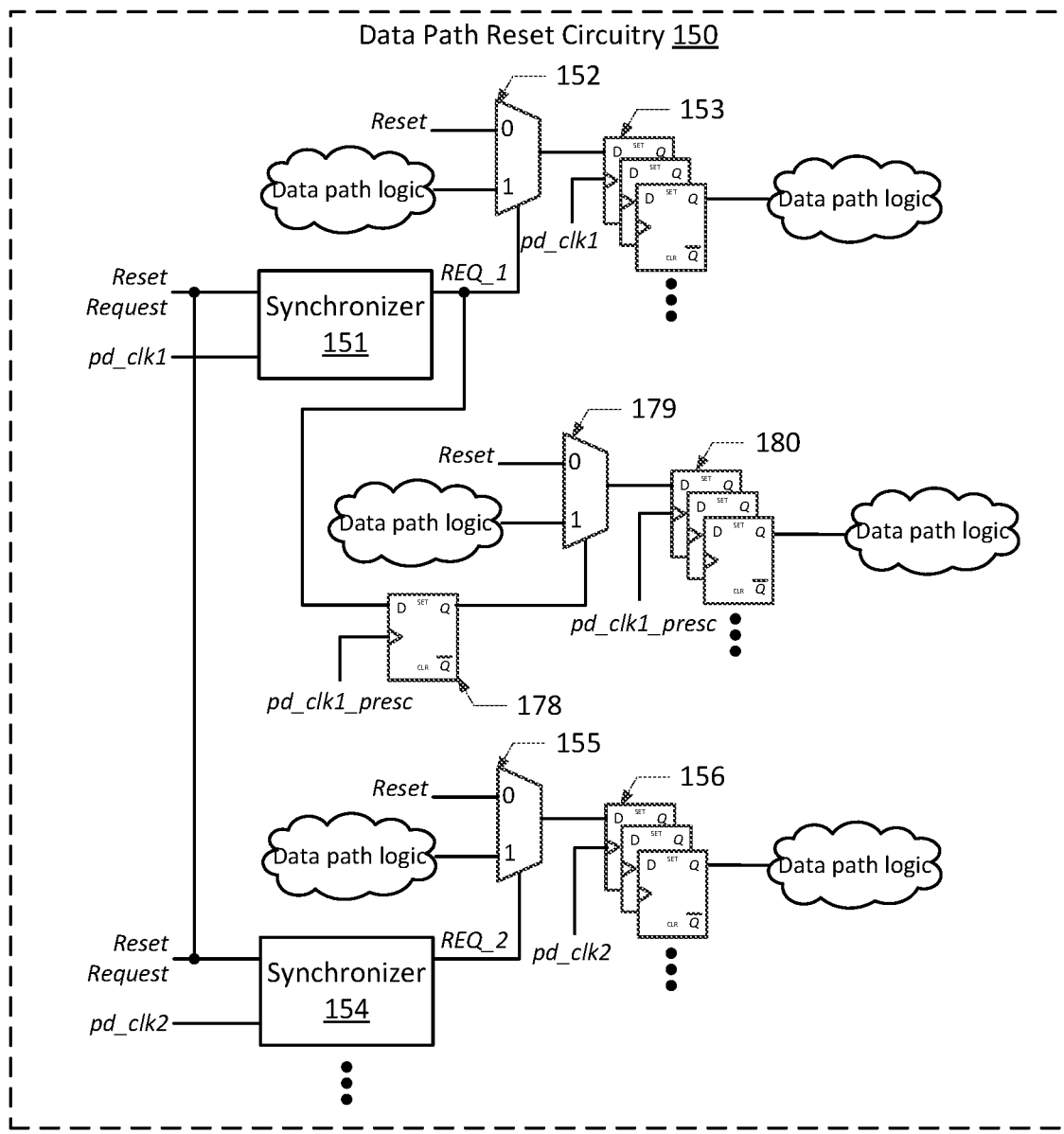
FIG. 10 is a block diagram illustrating yet another embodiment of the datapath reset circuitry shown in FIG. 4.
Figure 11:
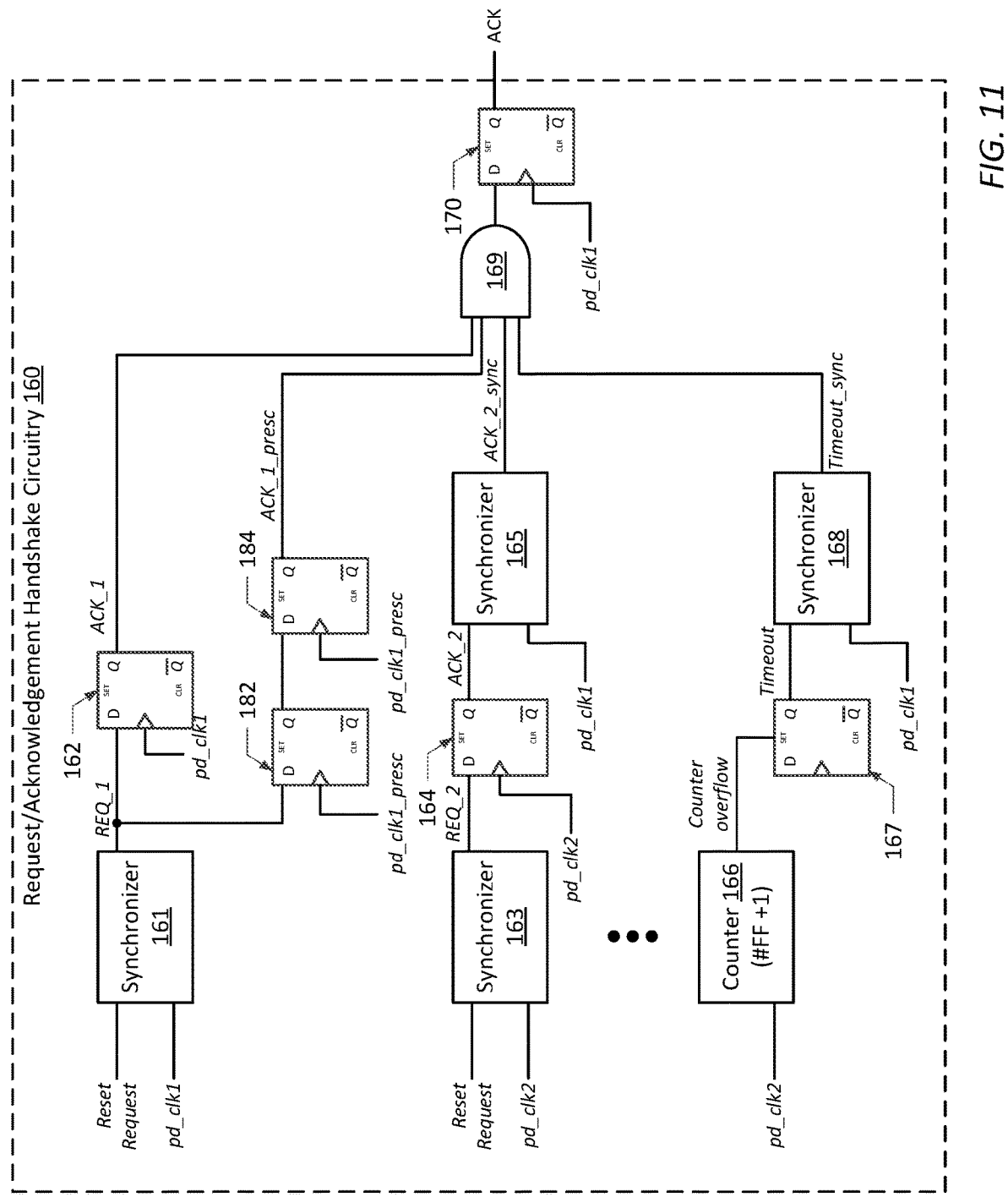
FIG. 11 is a block diagram illustrating another embodiment of the request/acknowledgement handshake circuitry shown in FIG. 4.
Figure 12:
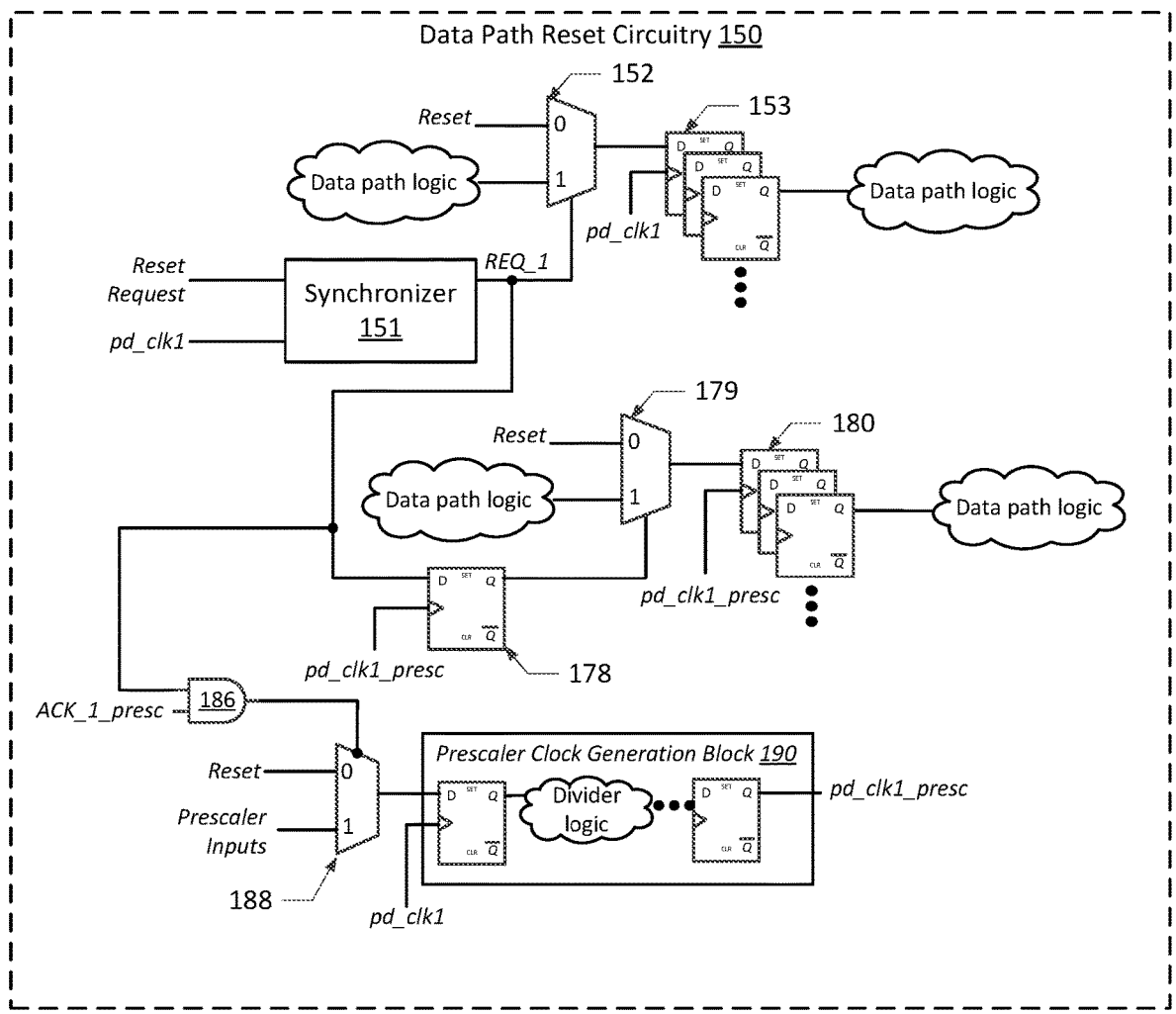
FIG. 12 is a block diagram illustrating yet another embodiment of the datapath reset circuitry shown in FIG. 4.

In some cases, a peripheral slave device may include a prescaler for scaling (or dividing) a clock frequency from one of its internal clock domains down to a smaller clock frequency that can be used to drive logic within the prescaled clock domain. In order to support peripheral slave devices containing prescalers, FIGS. 10-12 are provided herein to illustrate additional embodiments of the datapath reset circuitry 150 and the request/acknowledgement handshake circuitry 160 that may be included within a peripheral slave device containing multiple clock domains, where at least one of the peripheral clock domains is a prescaled clock domain. Like the previously disclosed embodiments, the datapath reset circuitry 150 and request/acknowledgement handshake circuitry 160 shown in FIGS. 10-12 provide a clean reset of all datapath logic included within a peripheral slave device when a prescaler is used to scale the reference clock domain (pd_clk1). As described in more detail below, the datapath reset request synchronized to the reference clock domain is captured in the prescaled clock domain and used to as a datapath reset for logic in the prescaled clock domain, and as an acknowledge for the prescaled clock domain. This manner of handling prescaled clocks can be extended to include additional prescalers and/or other types of prescalers that may be included within a peripheral slave device.

FIG. 10 illustrates another alternative embodiment of the datapath reset circuitry 150 shown in FIG. 5. In addition to the logic components shown in FIG. 5, the datapath reset circuitry 150 shown in FIG. 10 includes additional circuit components for resetting datapath logic in a prescaled clock domain (pd_clk1_presc), which is included within the peripheral slave device to generate a prescaled clock by scaling a clock frequency of the first peripheral clock domain (pd_clk1) down to a smaller clock frequency. It is noted that the additional circuit components shown in FIG. 10 could additionally or alternatively be used to reset datapath logic in other prescaled clock domains contained within one or more additional peripheral clock domains.

As shown in FIG. 10, the additional circuit components included within datapath reset circuitry 150 for resetting datapath logic in the prescaled clock domain (pd_clk1_presc) includes a first storage element (178) for capturing the synchronized datapath reset request (REQ_1), which was synchronized by synchronizer circuit 151 to the first peripheral clock domain (pd_clk1), and a second multiplexer (179) for resetting the datapath logic contained within the prescaled clock domain. Upon receiving the synchronized datapath reset request (REQ_1) from synchronizer circuit 151, the first storage element (178) registers the request and outputs the request on a subsequent clock pulse of the prescaled clock supplied to the prescaled clock domain (pd_clk1_presc). Upon receiving the synchronized reset request (REQ_1) at its select input, the second multiplexer (179) supplies a reset value (Reset) to all storage elements (e.g., flip-flops) (180) included within the prescaled clock domain (pd_clk1_presc) to reset the datapath logic contained therein. If a synchronized reset request (REQ_1) is not received, the second multiplexer (179) forwards data to the storage elements (180) instead of the reset value.

FIG. 11 illustrates an alternative embodiment of the request/acknowledgement handshake circuitry 160 shown in FIG. 6. In addition to the logic components shown in FIG. 6, the request/acknowledgement handshake circuitry 160 shown in FIG. 11 includes a fourth storage element (182) and a fifth storage element (184), which are clocked by the prescaled clock domain (pd_clk1_presc). The fourth storage element (182) receives the datapath reset request (REQ_1), which was synchronized by synchronizer circuit (161) to the reference clock domain (pd_clk1), and outputs the synchronized datapath reset request (REQ_1) on a subsequent clock pulse of a prescaled clock supplied to the prescaled clock domain (pd_clk1_presc). The fifth storage element (184), which is coupled to the output of the fourth storage element (182), generates an acknowledgement (ACK_1_presc) for the prescaled clock domain (pd_clk1_presc). The acknowledgement (ACK_1_presc) for the prescaled clock domain is supplied to AND gate 169, where it is combined with the synchronized ACKs (ACK_1, ACK_2 sync) and the synchronized timeout value (Timeout_sync) into a single ACK. In doing so, the request/acknowledgement handshake circuitry 160 shown in FIG. 11 ensures that the datapath logic within the prescaled clock domain (pd_clk1_presc) is reset before a combined ACK is supplied to host device 110 to complete the reset process.

FIG. 12 illustrates another embodiment of the datapath reset circuitry 150, which handles datapath resets in a prescaled clock domain (pd_clk1_presc). More specifically, the datapath reset circuitry 150 shown in FIG. 12 ensures that the prescaled clock domain (pd_clk1_presc) receives the correct frequency and prevents setup/hold violations, which may otherwise occur on the datapath of the storage elements (180) in the prescaled clock domain (pd_clk1_presc) shown in FIG. 10, potentially causing the circuit to fail. In order to perform such function, the datapath reset circuitry 150 shown in FIG. 12 includes additional circuit components that hold the clock divider flip-flops to reset from the datapath reset request, which generate the prescaled clock supplied to the prescaled clock domain (pd_clk1_presc), until the acknowledgement (ACK_1_presc) for the prescaled clock domain is generated. Resetting the clock divider flip-flops after the prescaled clock domain is reset ensures that the prescaled clock domain (pd_clk1_presc) receives the correct frequency of the prescaled clock, and further ensures that there will be no setup/hold violations on the datapath of the storage elements (180) in prescaled clock domain (pd_clk1_presc).

In the embodiment shown in FIG. 12, the additional circuit components included within datapath reset circuitry 150 include AND gate 186 and a third multiplexer (188). A first input of AND gate 186 is coupled to receive the datapath reset request (REQ_1) synchronized by synchronizer circuit 151 to the first peripheral clock domain (pd_clk1). A second input of AND gate 186 is coupled to receive the acknowledgement (ACK_1_presc) generated by the fifth storage element (184) in the prescaled clock domain (see, FIG. 11). An output of AND gate 186 is coupled to the select input of the third multiplexer (188), which is coupled to supply either prescaler inputs or a reset value (Reset) to a prescaler clock generation block (190), depending on the logic value supplied to its select input. As shown in FIG. 12, prescaler clock generation block (190) includes clock divider flip-flops and divider logic in the first peripheral clock domain (pd_clk1) that generate the prescaled clock supplied to the prescaled clock domain (pd_clk1_presc).

In the datapath reset circuitry 150 shown in FIG. 12, the third multiplexer (188) supplies prescaler inputs to the prescaler clock generation block (190) until AND gate 186 receives both the synchronized datapath reset request (REQ_1) and the acknowledgement (ACK_1_presc) for the prescaled clock domain. Upon receiving REQ_1 and ACK_1_presc, AND gate 186 supplies a signal to the select input of the third multiplexer (188), which causes multiplexer 188 to supply the reset value (Reset) to the clock divider flip-flops included within prescaler clock generation block (190). This resets the clock divider flip-flops, thereby ensuring that the prescaled clock domain (pd_clk1_presc) receives the correct frequency of the prescaled clock, and preventing setup/hold violations on the datapath of the storage elements (180) in prescaled clock domain (pd_clk1_presc).

A skilled artisan would readily understand that the storage elements and synchronization circuits included within datapath reset circuitry 150 (e.g., 151, 154, 161, 162, 163, 164, 165, 166, 167, 168, 170, 178, 182, 184) are not self-affected by the datapath reset. These are reset only by asynchronous system reset in order to maintain the logic needed to generate datapath reset request and acknowledgment not only to the peripheral slave device, but also back to the host device.

Figure 13:
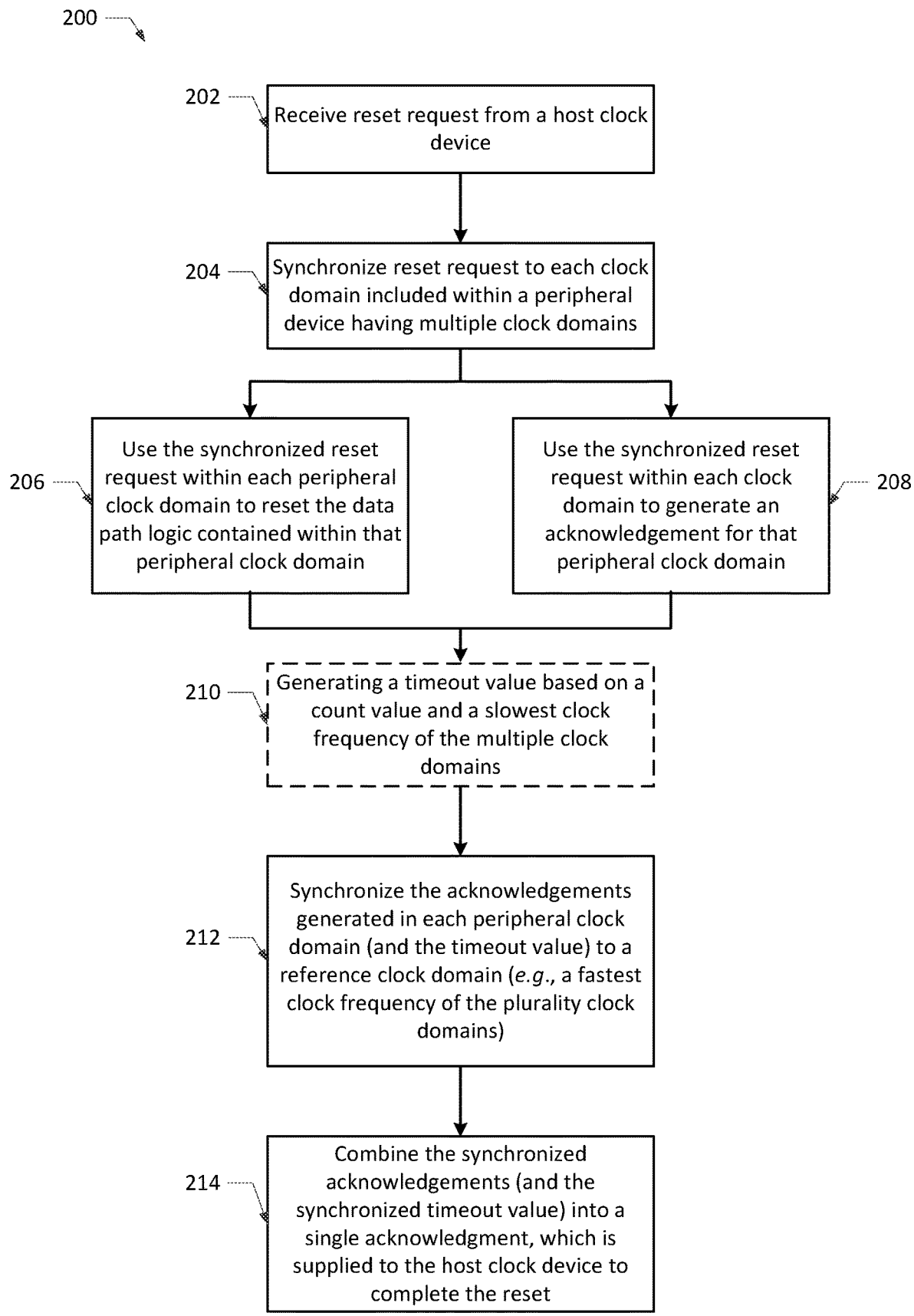
FIG. 13 is a flow chart diagram illustrating one embodiment of a method to reset the datapath logic included within each clock domain of a peripheral slave device having multiple clock domains.

FIG. 13 illustrates one embodiment of a method (200) that may be used to reset all datapath logic within a peripheral slave device having multiple clock domains. Although not strictly limited to such, the method shown in FIG. 13 may be performed by one or more embodiments of the datapath reset circuitry 150 shown in FIGS. 5, 8, 10 and 12 and the request/acknowledgement handshake circuitry 160 shown in FIGS. 6 and 11. It is noted, however, that one skilled in the art would understand how alternative embodiments of the datapath reset circuitry 150 and request/acknowledgement handshake circuitry 160 shown and described herein could be used to perform the method steps shown in FIG. 13.

The method shown in FIG. 13 may begin (in step 202) upon receiving a reset request from a host clock device to reset the peripheral slave device. When a reset request is received (e.g., from host device 110 or program instructions executed thereon), method 200 synchronizes the received reset request to each peripheral clock domain included within a peripheral slave device containing multiple, asynchronous clock domains (in step 204), and uses the synchronized reset request generated within each peripheral clock domain to reset the datapath logic contained within that peripheral clock domain (in step 206). Although not strictly limited to such, the datapath reset circuitry 150 shown in FIG. 5, 8, 10 or 12 may be used to perform steps 204 and 206, in some embodiments.

As the datapath logic is being reset (in step 206), the synchronized reset request generated within each peripheral clock domain is also used to generate an acknowledgement for that peripheral clock domain (in step 208). In some embodiments, method 200 may synchronize the acknowledgements (ACKs) generated in each peripheral clock domain to a reference clock domain (e.g., a fastest one of the peripheral clock domains) (in step 212), and may combine the synchronized ACKs into a signal ACK, which is supplied to the host clock device to complete the reset (in step 214).

In other embodiments, method 200 may include one or more additional steps to ensure that all ACKs are generated in the peripheral clock domains (in step 208) and synchronized to the reference clock domain (in step 212) before they are combined into a single ACK (in step 214). For example, method 200 may generate a timeout value based on a count value and a slowest clock frequency of the multiple clock domains (in step 210). In some embodiments, the count value may be substantially equal to the number of flip-flop stages included a synchronizer circuit plus one clock cycle to ensure that MTBF (Mean Time Between Failures) is met or exceeded for the synchronizer circuit. Setting the count value substantially equal to the number of flip-flop stages included within a synchronizer circuit plus one clock cycle ensures that the timeout value will not be generated (in step 210) until an ACK is generated in the slowest peripheral clock domain. Once a timeout value is generated (in step 210), the timeout value may be synchronized to the reference clock domain (in step 212) and combined with the synchronized ACKs from the peripheral clock domains to provide a single ACK (in step 214). Although not strictly limited to such, the request/acknowledgement handshake circuitry 160 shown in FIG. 6 or FIG. 11 may be used to perform steps 208, 210, 212 and 214, in some embodiments.

It will be appreciated to those skilled in the art having the benefit of this disclosure that this disclosure is believed to provide various embodiments of improved system, circuitry and related methods to reset all datapath logic within a peripheral slave device having multiple clock domains. Further modifications and alternative embodiments of various aspects of the disclosure will be apparent to those skilled in the art in view of this description. It is to be understood that the various embodiments of the disclosed system, circuitry and related methods shown and described herein are to be taken as the presently preferred embodiments. Elements and materials may be substituted for those illustrated and described herein, parts and processes may be reversed, and certain features of the disclosed embodiments may be utilized independently, all as would be apparent to one skilled in the art after having the benefit of this disclosure. It is intended, therefore, that the following claims be interpreted to embrace all such modifications and changes and, accordingly, the specification and drawings are to be regarded in an illustrative rather than a restrictive sense.

What is claimed is:

1. A method to reset datapath logic within a peripheral slave device including a plurality of peripheral clock domains, the method comprising:
   receiving a reset request from a host clock device to reset the peripheral slave device, wherein the plurality of peripheral clock domains included within the peripheral slave device are asynchronous to each other;
   synchronizing the received reset request to each of the plurality of peripheral clock domains to generate a synchronized reset request for each respective peripheral clock domain; and
   using the synchronized reset request generated within each peripheral clock domain to reset datapath logic contained within that peripheral clock domain.

2. The method as recited in claim 1, wherein as the datapath logic is being reset, the method further comprises:
   using the synchronized reset request generated within each peripheral clock domain to generate an acknowledgement for that peripheral clock domain;
   synchronizing the acknowledgements generated in each peripheral clock domain to a reference clock domain; and
   combining the synchronized acknowledgements into a single acknowledgement, which is supplied to the host clock device to complete the reset.

3. The method as recited in claim 2, further comprising:
   generating a timeout value based on a count value in a slowest clock frequency of the peripheral clock domains;
   synchronizing the timeout value to the reference clock domain; and
   combining the synchronized timeout value and the synchronized acknowledgements into a single acknowledgement, which is supplied to the host clock device to complete the reset.

4. The method as recited in claim 3, wherein the count value is substantially equal to a number of flip-flop stages included in a synchronizer circuit plus one clock cycle, and wherein the synchronizer circuit is used to synchronize an acknowledgement generated in one of the peripheral clock domains.

5. A method to reset datapath logic within a peripheral slave device including a plurality of peripheral clock domains, the method comprising:
   receiving a reset request from a host clock device to reset the peripheral slave device;
   synchronizing the received reset request to each peripheral clock domain to generate a synchronized reset request for each peripheral clock domain; and
   using the synchronized reset request generated within each peripheral clock domain to reset datapath logic contained within that peripheral clock domain;
   wherein as the datapath logic is being reset, the method further comprises:
   using the synchronized reset request generated within each peripheral clock domain to generate an acknowledgement for that peripheral clock domain;
   synchronizing the acknowledgements generated in each peripheral clock domain to a reference clock domain; and
   combining the synchronized acknowledgements into a single acknowledgement, which is supplied to the host clock device to complete the reset.

6. The method as recited in claim 5, further comprising:
   generating a timeout value based on a count value in a slowest clock frequency of the peripheral clock domains;
   synchronizing the timeout value to the reference clock domain; and
   combining the synchronized timeout value and the synchronized acknowledgements into a single acknowledgement, which is supplied to the host clock device to complete the reset.

7. The method as recited in claim 6, wherein the count value is substantially equal to a number of flip-flop stages included in a synchronizer circuit plus one clock cycle, and wherein the synchronizer circuit is used to synchronize an acknowledgement generated in one of the peripheral clock domains.

8. A system, comprising:
   a host device;
   at least one peripheral slave device communicatively coupled to the host device, wherein the at least one peripheral slave device comprises:
   a plurality of peripheral clock domains that are asynchronous to each other and asynchronous to a host clock associated with the host device;
   datapath reset circuitry, which is coupled to receive a datapath reset request from the host device and configured to reset datapath logic contained within each of the peripheral clock domains; and request/acknowledgement handshake circuitry, which is coupled to receive the datapath reset request from the host device and configured to coordinate a request/acknowledgement handshake between the host device and each of the peripheral clock domains to complete a reset process for the at least one peripheral slave device.

9. The system as recited in claim 8, wherein for each peripheral clock domain included within the at least one peripheral slave device, the datapath reset circuitry comprises:

a first synchronizer circuit coupled to receive the datapath reset request from the host device and configured to synchronize the datapath reset request to the peripheral clock domain; and a first multiplexer coupled to the first synchronizer circuit and configured to reset datapath logic contained within the peripheral clock domain upon receiving the synchronized datapath reset request from the synchronizer circuit at a select input of the first multiplexer.

10. The system as recited in claim 8, wherein for each peripheral clock domain included within the at least one peripheral slave device, the request/acknowledgement handshake circuitry comprises:

a first synchronizer circuit coupled to receive the datapath reset request from the host device and configured to synchronize the datapath reset request to the peripheral clock domain; and a first storage element coupled to receive the synchronized datapath reset request from the first synchronizer circuit and configured to generate an acknowledgement for the peripheral clock domain.

11. The system as recited in claim 9, wherein the first multiplexer is configured to:

supply a reset value to all storage elements included within the peripheral clock domain to reset datapath logic contained within the peripheral clock domain if the synchronized datapath reset request is received at the select input of the first multiplexer; and supply a signal from the peripheral clock domain to the storage elements in the peripheral clock domain if the synchronized datapath reset request is not received at the select input of the first multiplexer.

12. The system as recited in claim 9, wherein the datapath reset circuitry comprises additional circuit components for resetting datapath logic in a prescaled clock domain included within the at least one peripheral slave device, and wherein the additional circuit components comprise:

a first storage element coupled to receive the synchronized datapath reset request from the first synchronizer circuit in a first one of the peripheral clock domains and configured to output the synchronized datapath reset request on a subsequent clock pulse of a prescaled clock supplied to the prescaled clock domain; and a second multiplexer coupled to receive the synchronized datapath reset request from the output of the first storage element at a select input of the second multiplexer, wherein upon receiving the synchronized datapath reset request, the second multiplexer is configured to supply a reset value to all storage elements included within the prescaled clock domain to reset datapath logic contained within the prescaled clock domain.

13. The system as recited in claim 9, wherein the datapath reset circuitry comprises additional circuit components for resetting a second synchronizer circuit contained within a second one of the peripheral clock domains for synchronizing signals that cross from a first one of the peripheral clock domains to the second one of the peripheral clock domains.

14. The system as recited in claim 10, wherein one of the peripheral clock domains is designated as a reference clock domain, and wherein for each peripheral clock domain that is asynchronous to the reference clock domain, the request/acknowledgement handshake circuitry further comprises:

a second synchronizer circuit coupled to receive the acknowledgement generated by the first storage element in that peripheral clock domain and configured to synchronize the acknowledgement to the reference clock domain.

15. The system as recited in claim 13, wherein the additional circuit components comprise:

a second multiplexer coupled to receive the synchronized datapath reset request from the first synchronizer circuit in the first one of the peripheral clock domains at a select input of the second multiplexer, wherein the second multiplexer is configured to output:
a reset value if the synchronized datapath reset request is received at the select input of the second multiplexer; and
a signal from the peripheral clock domain if the synchronized datapath reset request is not received at the select input of the second multiplexer;

an AND gate having a first input coupled to the output of the second multiplexer and a second input coupled to receive an asynchronous system reset; and a second storage element having an inverted clear input coupled to an output of the AND gate.

16. The system as recited in claim 14, wherein the request/acknowledgement handshake circuitry further comprises an AND gate:

wherein the AND gate is coupled to receive an acknowledgment generated by the first storage element in the reference clock domain and one or more synchronized acknowledgements generated by one or more second synchronizer circuits in one or more asynchronous peripheral clock domains; and wherein the AND gate is configured to combine the received acknowledgements into a single acknowledgement.

17. The system as recited in claim 15:

wherein the second storage element is configured to generate a trigger, which is set by the signal received from the first one of the peripheral clock domains and cleared when the reset value or the asynchronous system reset is supplied to the first or second inputs of the AND gate; and wherein the second synchronizer circuit is reset to a reset state when the trigger generated by the second storage element is cleared.

18. The system as recited in claim 16, wherein the request/acknowledgement handshake circuitry further comprises a second storage element coupled to an output of the AND gate, wherein the second storage element is clocked by the reference clock domain and coupled to supply the single acknowledgment to the host device to complete the reset process.

19. The system as recited in claim 16, wherein the request/acknowledgement handshake circuitry further comprises:

a counter configured to count a number of clock pulses in a slowest clock frequency of the peripheral clock domains and configured to overflow when a count value is reached;

a third storage element configured to generate a timeout value when the counter overflow is supplied to a set input of the third storage element; and a third synchronizer circuit coupled to receive the timeout value generated by the third storage element and configured to synchronize the timeout value to the reference clock domain.

20. The system as recited in claim 16, wherein the request/acknowledgement handshake circuitry includes additional circuit components to generate an acknowledgement for a prescaled clock domain included within the at least one peripheral slave device, and wherein the additional circuit components comprise:

a fourth storage element, which is coupled to receive the synchronized datapath reset request from the first synchronizer circuit in the reference clock domain and configured to output the synchronized datapath reset request on a subsequent clock pulse of a prescaled clock supplied to the prescaled clock domain; and a fifth storage element, which is coupled to the output of the fourth storage element and configured to generate the acknowledgement for the prescaled clock domain.

21. The system as recited in claim 19, wherein the count value is substantially equal to a number of flip-flop stages included within the second synchronizer circuit plus one clock cycle.

22. The system as recited in claim 19, wherein the AND gate is coupled to receive the synchronized timeout value from the third synchronizer circuit and configured to combine the received acknowledgements and the synchronized timeout value into a single acknowledgement.

23. The system as recited in claim 20, wherein the AND gate is further coupled to receive the acknowledgement generated by the fifth storage element for the prescaled clock domain.

24. The system as recited in claim 20, wherein the datapath reset circuitry further comprises:

an AND gate coupled to output a logic value upon receiving both the synchronized datapath reset request from the first synchronizer circuit in the reference clock domain and the acknowledgement generated by the fifth storage element for the prescaled clock domain; and a third multiplexer coupled to receive the output of the AND gate at a select input of the third multiplexer;

wherein an output of the third multiplexer is coupled to a prescaler clock generation block, which is included within the at least one peripheral slave device for generating the prescaled clock, and wherein the third multiplexer is configured to output:

a reset value if the logic value is received at the select input of the third multiplexer; and a prescaler input if the logic value is not received at the select input of the third multiplexer.

* * * * *